United States Patent Office 3,549,385
Patented Dec. 22, 1970

3,549,385
METHOD FOR PRODUCING CORNED MEAT PRODUCTS
Harry F. Bernholdt, Park Forest, Ill., assignor to Swift & Company, Chicago, Ill., a corporation of Delaware
No Drawing. Filed Mar. 15, 1967, Ser. No. 623,203
Int. Cl. A23b 1/03
U.S. Cl. 99—107                                3 Claims

ABSTRACT OF THE DISCLOSURE

A method for preparing corned meat products. The products are prepared by treatment with a brine solution containing active proteolytic enzyme in the absence of an inhibiting additive.

---

The present invention relates to a new and improved method for preparing corned meat products and to the products prepared thereby. More particularly, it relates to a method for preparing corned meat products, utilizing the enzymic action of proteolytic enzymes, such corned meat products possessing the capability of being dry roasted to provide a cooked product having improved properties with regard to flavor, tenderness and sliced yield.

Heretofore, the conventional procedure for preparing corned meat products has included the following steps. First a curing or pickling solution containing salt, sugar, nitrate and nitrite has been pumped into the arterial system of a meat cut or injected deep into a meat cut at many points. After the meat cut has thus been pumped, it has been submerged or covered with a pickling solution. This pickling solution has constituted a salt brine wherein about 8 to 12% salt is usually present and also varying amounts of sugar, nitrate and nitrite. The pumped meat cut has been held in this cover pickle solution for about 7 to 15 days in order to completely cure the product. The resultant corned meat product has usually had a salt content of between 3% and 5.5% before cooking.

The above mentioned conventional manner of preparing corned meat products entails certain economically important disadvantages. For example, the relatively long period which the meat cut must be held in the cover pickle solution to completely cure the product and the high salt content of the solution will be recognized as being commercially disadvantageous. Therefore, it would be desirable to develop a method for producing corned meat products which would minimize the curing time and require substantially lower quantities of salt in the pickling solution.

Perhaps the most important disadvantage encountered with corned beef products prepared by the heretofore conventional methods arises in the cooking of the product. In order to attain sufficient tenderness of the cooked product, it has been necessary to simmer the corned meat product in water in a covered kettle for several hours. It has not been feasible, heretofore, to merely dry roast the product since the conventionally prepared product when dry roasted would exhibit characteristics which would render the product unacceptable to the consumer. As a result, the benefits of dry roasting as to flavor and convenience has never been practical with regard to corned meat products. In cooking conventionally prepared corned meat products, it has been necessary to stand by to add more water, adjust the heat to keep the water simmering and not boiling, wipe off a water-spattered range or discard quantities of hot, greasy water. Additionally, the product prepared by this long simmering cook has not exhibited the true flavor of the corned meat product since flavor has been lost in the cooking water. Furthermore, the long simmering cook has caused considerable dimensional shrink of the product and therefore reduced the sliced yield of the product.

Admittedly, some reference to the use of a proteolytic enzyme in a method for the corning of beef has previously been made. However, it has not been recognized heretofore that the active enzyme could be employed in a method for preparing corned meat products without certain enzyme activity inhibiting additives. Also, no previous indication has been given that the introduction of minute quantities of said active proteolytic enzyme as is utilized herein would be effective to produce the unexpected and improved results achieved herein. Furthermore, it has not previously been considered feasible to dry roast corned meat products, except perhaps when premium quality meat has been employed.

It is therefore an object of the present invention to provide a new and improved method for preparing corned meat products which can be dry roasted to provide a cooked product having improved flavor, increased tenderness and greater sliced yield.

Another object of the present invention is to provide a new and improved corned meat product which is capable of being dry roasted to produce a cooked product having improved flavor, increased tenderness and greater sliced yield.

A further object is to provide a new and improved method for preparing corned meat products utilizing the enzymic action of proteolytic enzymes in the absence of enzyme activity inhibiting additives.

A still further object is to provide a new and improved method for preparing corned meat products which is more efficient and economical than conventional procedures heretofore employed in preparing corned meat products.

Other objects will be apparent to one skilled in the art from the following detailed description of the invention.

In general the instant invention comprises dispersing throughout the mass of a meat cut a brine solution containing from about .0004% to about .0015% active proteolytic enzyme (based on the total volume of the brine solution) in the absence of an enzyme activity inhibiting additive. The meat cut into which the brine solution is introduced may be from any part of the beef carcass, but the plate (brisket) or round pieces are generally preferred. The meat is then cured in a cover pickle having a relatively low salt concentration. The resulting corned meat product has been found to be capable of being dry roasted, and the roasted product exhibits improved flavor, increased tenderness and greater sliced yield than products perpared by heretofore conventional procedures.

More specifically, the method of the present invention comprises forming a brine solution or pumping pickle containing from about 4 to about 5% salt, plus sugar, nitrate and nitrite. The brine solution is then mixed with an enzyme solution in a manner such that the resultant brine solution will contain from about .0004% to about .0015% active proteolytic enzyme (based on the total volume of the brine solution), with a preferred range of from about .0006% to about .001% active proteolytic enzyme.

The enzymes useful in the method of the present invention fall within the grouping of proteolytic enzymes, i.e., those hydrolyzing proteins. Proteolytic enzymes which have been found to be most desirable for use in the method are papain, bromelain and mixtures thereof. The enzyme solution is prepared by forming a slurry of equal parts of enzyme and glycerin and then adding salt and dissolving the slurry in water.

Following mixing of the pumping pickle solution and the enzyme solution, the resulting solution is introduced into the meat cut. A preferred means of introducing the solution into the meat cut is by spray pump injection; however, other convenient injection techniques may be employed, but arterial pumping should be avoided since this procedure results in undesirable pocketing of the enzyme resulting in lack of uniformity of tenderness and areas of mushiness. The meat cut should be pumped to a weight gain of from about 15% to about 30% with a preferred weight gain of about 20%. If the weight gain resulting from pumping is less than about 15%, the resulting roasted product will exhibit insufficient tenderness, whereas if the meat cut is pumped to a weight gain greater than about 30%, the roasted product will exhibit a tendency toward texture breakdown and hence mushiness.

The meat cut is then submerged or covered with a pickling solution containing salt, sugar, nitrate and nitrite. The salt content of the cover pickle solution is variable but relatively low. In a preferred embodiment of the invention, the salt concentration should be in a range of from about 4% to about 5% of the brine solution. The product should be held in the cover pickle solution for a period of from about 3 to about 9 days with a preferred holding period of about 7 days. If the product is held in the salt brine for too long a period, the roasted product will be too salty.

It has been found that in order to produce a corned meat product which is capable of being dry roasted, the salt content of the product on an uncooked basis should be in a range of from about 1.5% to about 3% as opposed to the heretofore conventional range of from 3% to 5.5% salt content of conventionally prepared product on an uncooked basis. A preferred salt content of the instant product on an uncooked basis is about 2%. If the salt concentration in the roasted product is greater than about 3%, the product will be too salty for consumer acceptance whereas salt concentrations below about 1.5% will give a cooked product which may be too bland.

As above mentioned, the preferred proteolytic enzymes to be employed in the method of this invention are papain, bromelain, and mixtures thereof. It has further been pointed out that the amount of enzyme or mixture of enzymes to be employed in the brine or pumping solution is in a range of from about .0004% to about .0015% (based on the total volume of the brine solution). However, it should be noted that commercially available enzyme powders which may be used to prepare the enzyme solution will vary as to total proteolytic activity and therefore the precise concentration of enzyme to be employed will vary somewhat in direct relation to the activity of the particular enzyme powder employed. But, with regard to mixtures of enzymes, the ratio of enzymes to be mixed on an activity basis (i.e., the relative activity contributed by each enzyme to total 100% of the enzyme activity) will remain constant. It has been found that when a mixture of papain and bromelain wherein the papain contributes 75% of the total enzyme activity and bromelain the other 25% is incorporated into the pumping pickle that the resulting product after being roasted exhibits extremely good characteristics, particularly as to tenderness and resistance to texture breakdown and hence mushiness even after prolonged holding of the roasted product on a steam table at temperatures of from 120° to 160° F.

The following examples are intended to illustrate specific embodiments of the invention and should not be considered to impose any limitations on the invention.

EXAMPLE I

An enzyme solution having the following formulation of ingredients was prepared:

|  | Percent |
| --- | --- |
| Papain (contributes 75% of total enzyme activity) | .0495 |
| Bromelain (contributes 25% of total enzyme activity) | .0265 |
| Glycerin | .0760 |
| Salt | 2.0000 |
| Water | 97.8580 |

Ten ounces of the above-mentioned enzyme solution were added to 100 gallons of a 25° salometer pumping pickle solution (4.71% salt). The pumping pickle had the following proportions of ingredients:

|  | Percent |
| --- | --- |
| Sodium nitrate | 0.08 |
| Sodium nitrite | 0.08 |
| Raw sugar | 2.14 |
| Salt | 4.71 |
| Water | 92.99 |

Following mixing of the enzyme solution and the pumping pickle solution, the resulting solution was spray pumped into several meat cuts (tip and plate ends of a beef brisket) using an Anco injector. The meat cuts were each pumped to approximately a 20% gain in weight. The pumped meat cuts were then drained and placed in a 25° salometer cover pickle solution (4.71% salt). The meat cuts were held in the cover pickle for a period of 7 days. The products were then removed from the cover pickle solution and drained. The resulting products were placed on racks in shallow open pans in an oven and dry roasted at a temperature of 325° F. until the products were fork tender (about 3 hours). For the purpose of comparison, conventionally prepared corned beef briskets were roasted under identical conditions. The roasted corned beef briskets were then randomly allocated to four panel evaluations of tenderness. The first two panels included tip samples, the second two, plate end samples. Both right and left sides of briskets were represented. The results (based on a 1–10 scoring scale with 1 equal very tough and 10 equal very tender) are set forth in the following table as mean panel scores:

|  | Convential corned beef | Enzy treated corned beef |
| --- | --- | --- |
| Brisket-tip | 6.86 | 9.05 |
| Brisket-plate | 6.38 | 8.09 |

In general, on the quality of beef used in this example (good and choice briskets) tenderness should average above 7.00 to be acceptable. It should be noted from the above tabulated results that the products prepared by the method of the instant invention exhibited statistically significant improvement in tenderness which is not achieved when conventionally prepared corn beef is oven roasted.

EXAMPLE II

By the method of Example I a corned meat product was prepared wherein an enzyme solution having the following formulation of ingredients was employed:

|  | Percent |
| --- | --- |
| Papain | .66 |
| Glycerin | .66 |
| Salt | 5.00 |
| Water | 93.68 |

The product was dry oven roasted until fork tender (about 3 hours) and was found to exhibit excellent characteristics as to flavor and tenderness.

EXAMPLE III

By the method of Example I a corned meat product was prepared wherein an enzyme solution having the following formuation of ingredients was employed:

| | Percent |
|---|---|
| Bromelain | 1.06 |
| Glycerin | 1.06 |
| Salt | 5.00 |
| Water | 92.88 |

The product was dry oven roasted until fork tender (about 3 hours) and was found to exhibit excellent characteristics as to flavor and tenderness.

EXAMPLE IV

By the method of Example I a corned meat product was prepared wherein an enzyme solution having the following formulation of ingredients was employed:

| | Percent |
|---|---|
| Papain (contributes 50% of total enzyme activity) | .33 |
| Bromelain (contributes 50% of total enzyme activity) | .53 |
| Glycerin | .86 |
| Salt | 5.00 |
| Water | 93.28 |

The product was dry oven roasted until fork tender (about 3 hours) and was found to exhibit excellent characteristics as to flavor and tenderness.

Obviously many modifications and variations of the invention as hereinbefore set forth may be made without departing from the spirit and scope thereof, and, therefore, only such limitations should be imposed as are indicated in the appended claims.

I claim:

1. A method for producing corned meat products which can be dry roasted to produce a product of improved flavor, increased tenderness and greater sliced yield, comprising: introducing into a meat cut a brine solution containing from about .0004% to about .0015% based on the total volume of the brine solution, of an active proteolytic enzyme formulation of papain and bromelain wherein the papain contributes a major portion of the total enzyme activity and the bromelain contributes a minor portion of the total enzyme activity, said brine solution also containing a salt concentration of about 4% to about 5% based on said total volume, in the absence of an inhibiting additive.

2. The method of claim 1 wherein the brine solution contains a proteolytic enzyme formulation of papain and bromelain wherein papain contributes 75% of the total enzyme activity and bromelain contributes 25% of the total enzyme activity.

3. In a method for preparing corned meat products which can be dry roasted to produce a product of improved flavor, increased tenderness and greater sliced yield the steps which comprise: forming a brine solution containing from about .0004% to about .0015%, based on the total volume of said brine solution, of an active proteolytic enzyme formulation of papain and bromelain wherein the papain contributes a major portion of the total enzyme activity and the bromelain contributes a minor portion of the total enzyme activity, said brine solution containing a salt concentration of about 4% to about 5% based on said total volume, in the absence of an inhibiting additive; introducing the said brine solution into a meat cut; holding said meat cut in a cover pickle solution having a relatively low salt contcentration of about 4% to about 5% for a period of time sufficient to produce a salt content in said meat cut on an uncooked basis of about 1.5% to about 3%, said pickle solution comprising a salt brine, sugar, nitrate and nitrite; and separating said meat from said pickle solution.

References Cited

UNITED STATES PATENTS

| 2,247,425 | 7/1941 | Williams | 99—159 |
| 2,471,282 | 5/1949 | Paddock | 99—159X |
| 3,166,423 | 1/1965 | Sleeth et al. | 99—159X |
| 3,215,534 | 11/1965 | Baum | 99—159X |
| 3,347,679 | 10/1967 | Nordin | 99—159X |

HYMAN LORD, Primary Examiner

U.S. Cl. X.R.

99—159, 222